US007656805B2

(12) United States Patent
Vigouroux et al.

(10) Patent No.: US 7,656,805 B2
(45) Date of Patent: Feb. 2, 2010

(54) OPTIMAL COMMUNICATION PATH ROUTING IN A SYSTEM EMPLOYING INTERCONNECTED INTEGRATED CIRCUIT TECHNOLOGY

(75) Inventors: Xavier-Francois Vigouroux, Lieu Dit le Montiou (FR); Bernard Tourancheau, Miribel (FR); Cedric Koch-Hofer, Saint Martin D'heres (FR)

(73) Assignee: Sun Microsystems, Inc., Santa Clara, CA (US)

( * ) Notice: Subject to any disclaimer, the term of this patent is extended or adjusted under 35 U.S.C. 154(b) by 719 days.

(21) Appl. No.: 11/219,153

(22) Filed: Sep. 2, 2005

(65) Prior Publication Data
US 2006/0018261 A1 Jan. 26, 2006

Related U.S. Application Data

(63) Continuation-in-part of application No. 10/853,936, filed on May 26, 2004, now Pat. No. 7,191,422.

(30) Foreign Application Priority Data
Feb. 24, 2005 (FR) .................................. 05 30014

(51) Int. Cl.
 *G01R 31/08* (2006.01)
 *G06F 15/173* (2006.01)
 *G06F 17/20* (2006.01)
(52) U.S. Cl. .................. 370/238; 709/241; 716/10; 716/12
(58) Field of Classification Search .............. 370/351, 370/463, 238, 238.1, 305; 709/238–241; 710/5–6, 100; 716/10, 12
See application file for complete search history.

(56) References Cited

U.S. PATENT DOCUMENTS

| 5,452,231 | A  | * | 9/1995  | Butts et al. ............... 716/16 |
| 5,606,551 | A  | * | 2/1997  | Kartalopoulos .......... 370/406 |
| 6,496,889 | B1 | * | 12/2002 | Perino et al. ............. 710/110 |
| 6,885,674 | B2 | * | 4/2005  | Hunt et al. ............... 370/420 |
| 6,913,517 | B2 | * | 7/2005  | Prasad ...................... 451/41 |
| 6,947,379 | B1 | * | 9/2005  | Gleichauf et al. ........ 370/229 |
| 6,961,782 | B1 | * | 11/2005 | Denneau et al. .......... 709/241 |
| 6,973,517 | B1 | * | 12/2005 | Golden et al. ............ 710/104 |
| 7,123,587 | B1 | * | 10/2006 | Hass et al. ................ 370/238 |
| 2001/0030969 | A1 | * | 10/2001 | Donaghey et al. ........ 370/397 |
| 2004/0042402 | A1 | * | 3/2004  | Galand et al. ............ 370/237 |
| 2004/0042403 | A1 | * | 3/2004  | Xu et al. .................. 370/238 |
| 2005/0078610 | A1 | * | 4/2005  | Previdi et al. ............ 370/254 |

FOREIGN PATENT DOCUMENTS

EP 0 343 611 A2 11/1989

OTHER PUBLICATIONS

Behjat L et al: "A novel eigenvector technique for large scale combinatorial problems in VLSI layout" Journal of Combinatorial Optimization Kluwer Acaademic Publishers Netherlands, vol. 6, No. 3, 2002.
European Search Report dated Jun. 30, 2005.

* cited by examiner

*Primary Examiner*—Kwang B Yao
*Assistant Examiner*—Candal Elpenord
(74) *Attorney, Agent, or Firm*—Osha · Liang LLP (57) ABSTRACT

An electronic system in which integrated circuits employing cornered I/O are arranged in a framework including an optional path manager and at least one updateable routing table. Packet routing options are described with solutions being provided to minimize transmission latency and pathway alternatives.

18 Claims, 6 Drawing Sheets

OPTIMAL COMMUNICATION PATH ROUTING IN A SYSTEM EMPLOYING INTERCONNECTED INTEGRATED CIRCUIT TECHNOLOGY

STATEMENT REGARDING FEDERALLY SPONSORED RESEARCH OR DEVELOPMENT

This invention was made with United States Government support under contract NBCH020055 awarded by the Defense Advanced Research Projects Administration. The United States Government has certain rights in the invention.

CROSS-REFERENCE TO RELATED APPLICATIONS

This application is based upon and claims the benefit of priority from the prior EPO application number EP 05300144.2 filed on Feb. 24, 2005, titled "OPTIMAL COMMUNICATION PATH ROUTING IN A SYSTEM EMPLOYING INTERCONNECTED INTEGRATED CIRCUIT TECHNOLOGY" and having the same inventors as the present application.

BACKGROUND

In electronic systems employing devices that must communicate with each other in order to accomplish tasks, it is important to ensure that packets are received at the intended destination device in a timely fashion. In systems employing interconnected integrated circuits, there may be multiple communications pathways that may be coupled together within the system as well as to the external environment. Thus, multiple possible communications pathways exist between the source and destination devices. Choosing one path over another for communications at a given moment may be inconsequential in systems where communication speed and efficiency is not a paramount concern. However, in systems having many such pathways and where communication speed needs to be optimized, communications pathway choice needs to be carefully considered.

In systems having just a few choices of possible communications pathways, it may be relatively simple to choose the communications pathway to use that minimizes the time a packet is in transition between the source and destination devices. However, in larger systems employing many devices and having many possible communications pathways between devices, it is necessary to approach the choice of a pathway more carefully. Further, having a systematic method for choosing an optimum pathway that minimizes transit time between source and destination increases system efficiency.

In a system having multiple intersecting communications pathways, a signal being routed from a source device to a destination device may have several possible choices of pathways at each intersection. For example, in a rectangular layout where a signal is going from the lower right corner to the upper left corner, there are likely to be many possible choices for routing a signal at each intersection. In addition to considering latency when routing a signal, other factors are considered, such as the possibility that a portion of a pathway may fail, thus requiring the system to reroute the signal.

SUMMARY

According to one aspect of one or more embodiments of the present invention, in an electronic system having multiple capacitively coupled interconnected rectangular integrated circuits forming multiple pathways for routing data packets between a source integrated circuit and a destination integrated circuit, a method is presented for routing a data packet. That method includes determining the number of buses the packet needs to travel over in each of at least two directions order to reach the destination integrated circuit, and causing the packet to be sent using an available pathway in the direction having the most buses in that direction.

According to one aspect of one or more embodiments of the present invention, an electronic system is described employing one or more integrated circuits having multiple communication pathways therein, those integrated circuits being interconnected to form a communications framework having at least one instance of multiple pathways being present between a source chip having a packet to send and a destination chip which is the destination for the packet.

According to another aspect of one or more embodiments of the present invention, routing is determined through the use of a path manager and updateable routing tables coupled to the integrated circuits, the routing table being updated by the path manager when the availability of a pathway changes.

According to another aspect of one or more embodiments of the present invention, the choice of pathways to use when routing the packet is at least partially dependent on the relative latency of available pathways, the choice being made to route the packet over the pathway which minimizes latency.

According to another aspect of one or more embodiments of the present invention, the choice of pathways to use when routing the packet is at least partially dependent on the number of available alternative pathways, the choice being made to route the packet over the pathway which minimizes latency and also maximizes the number of alternative pathway choices at devices likely to be handling the packet.

Other aspects of the invention will be apparent from the following description and the appended claims.

DETAILED DESCRIPTION

In this description, reference is made to integrated circuits and chips. Integrated circuits are typically referred to as circuitry present on a substrate, while chips are often meant to include additional structure such as packaging, switching functionality, interconnects, etc. It is intended that both terms be construed broadly and synonymously, so that each refers generally to circuits containing functionality, some of that circuitry being deposited on a substrate.

Figure 1A:
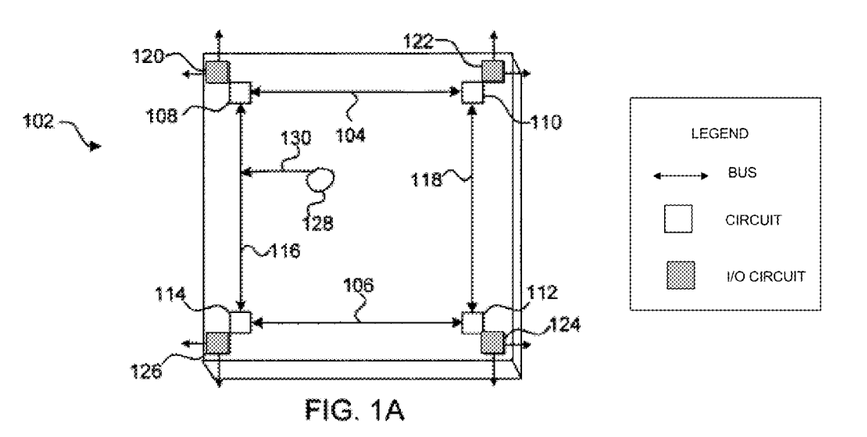
FIGS. 1A and 1B are functional block diagrams of integrated circuit (IC) carriers employing cornered input/output (I/O).
Figure 1B:
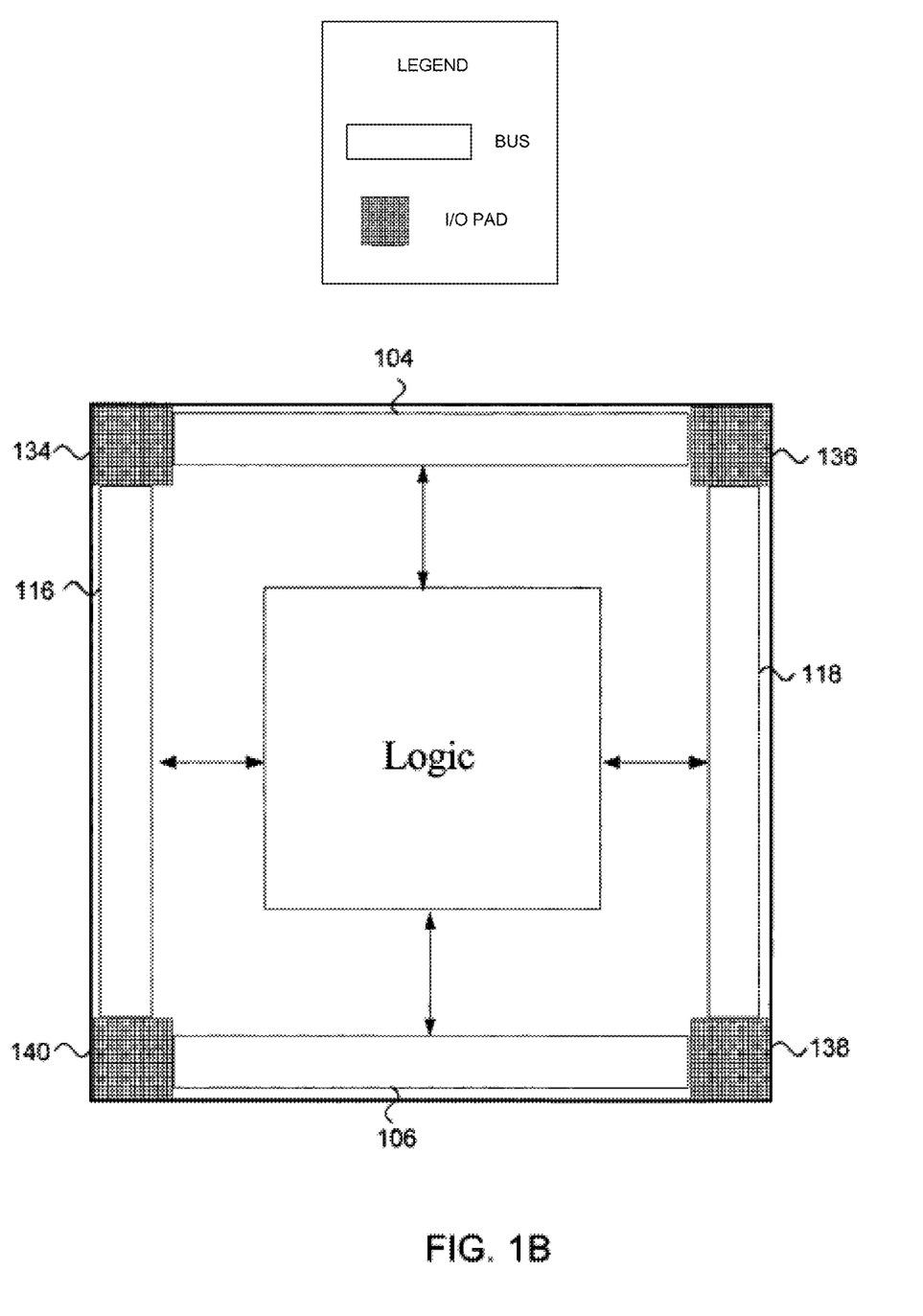

FIGS. 1A and 1B are functional block diagrams of integrated circuit (IC) carriers employing cornered input/output (I/O). When using cornered I/O, the I/O interfaces to the external environment are positioned generally towards the corners of a rectangular carrier containing the IC. A similar carrier employing cornered I/O is described in U.S. patent application Ser. No. 10/853,936 referenced above.

Data is transferred from one point to another over, for example, buses and pathways. "Pathways" refer to any form of communication medium through and between integrated circuits or chips over which data may pass from source to destination. By way of example, such a communication medium may include wireless transmission (e.g. capacitive coupling and the like) I/O pads that are physically connected to other circuitry, or any other suitable interface.

Those of ordinary skill in the art having the benefit of this disclosure will readily recognize that such integrated circuits may be similar and therefore have similar transmission latencies throughout. However, it is also true that the integrated circuits may differ in their configurations and therefore have dissimilar latencies. Latencies of communications pathways within integrated circuits may be determined by calculation, experimentally sending packets, or other techniques known to those of ordinary skill in the art.

In one or more embodiments of the present invention, latencies of pathways are determined experimentally during or within a reasonably short period following a power-up cycle. At such a time, packets are originated by each integrated circuit in the system, to each destination, and the time it takes for each packet to reach its destination is measured for various routing scenarios. Such information is then used to prepare routing tables which govern how packets travel from source to destination.

Referring to FIG. 1A, chip 102 has horizontal data buses 104 and 106. Bus 104 is configured to pass packets within chip 102 between circuits 108 and 110. Bus 106 is configured to pass packets within chip 102 between circuits 112 and 114. Chip 102 also has vertical data buses 116 and 118. Bus 116 is configured to pass packets within chip 102 between circuits 108 and 114. Bus 118 is configured to pass packets within chip 102 between circuits 110 and 112. I/O circuits 120, 122, 124, and 126 are configured to pass packets between their respective adjacent circuits 108, 110, 112, and 114 and the external environment. Although the data buses shown in FIG. 1 are generally oriented horizontally and vertically, the location of circuits 108, 110, 112, and 114 may be located in a different arrangement, such as approximately midway between the corners of each chip, accordingly causing buses 104, 106, 116, and 118 to be arranged differently. The exemplary chip configurations depicted and described herein are not intended to be limiting.

Buses 104, 106, 116 and 118 may be implemented in a variety of ways. For example, in one or more embodiments of the present invention, a bus may be bidirectional. In one or more other embodiments of the present invention, a bus may comprise a single pathway providing one way communication. In one or more other embodiments of the present invention, a bus may comprise a combination of one way pathways providing the equivalent of a bidirectional bus. In one or more embodiments of the present invention, multiple unidirectional or bidirectional buses may be present adjacent to each other to pass data between I/O circuits within a chip.

Referring to FIG. 1B, in an exemplary embodiment employing cornered I/O, where capacitive coupling between integrated circuits instead of more traditional pin-based connectivity, I/O pads 134, 136, 138, and 140 provide capacitive coupling between I/O circuits present on adjacent integrated circuits. Although depicted as a hatched surface, these I/O pads provide connectivity to many signal pathways each, thus providing multiple signal pathways per pad. Additional information regarding this form of connectivity is described in "Proximity Communication" by Robert J. Drost, Robert David Hopkins, and Ivan E. Sutherland (2003).

In one or more embodiments of the present invention, I/O pads such as 134, 136, 138, and 140 employ traditional pin-based connectivity. Persons of ordinary skill in the art having the benefit of this disclosure will readily discern other connectivity methods that may be employed while remaining within the scope and spirit of the present invention.

Figure 2:
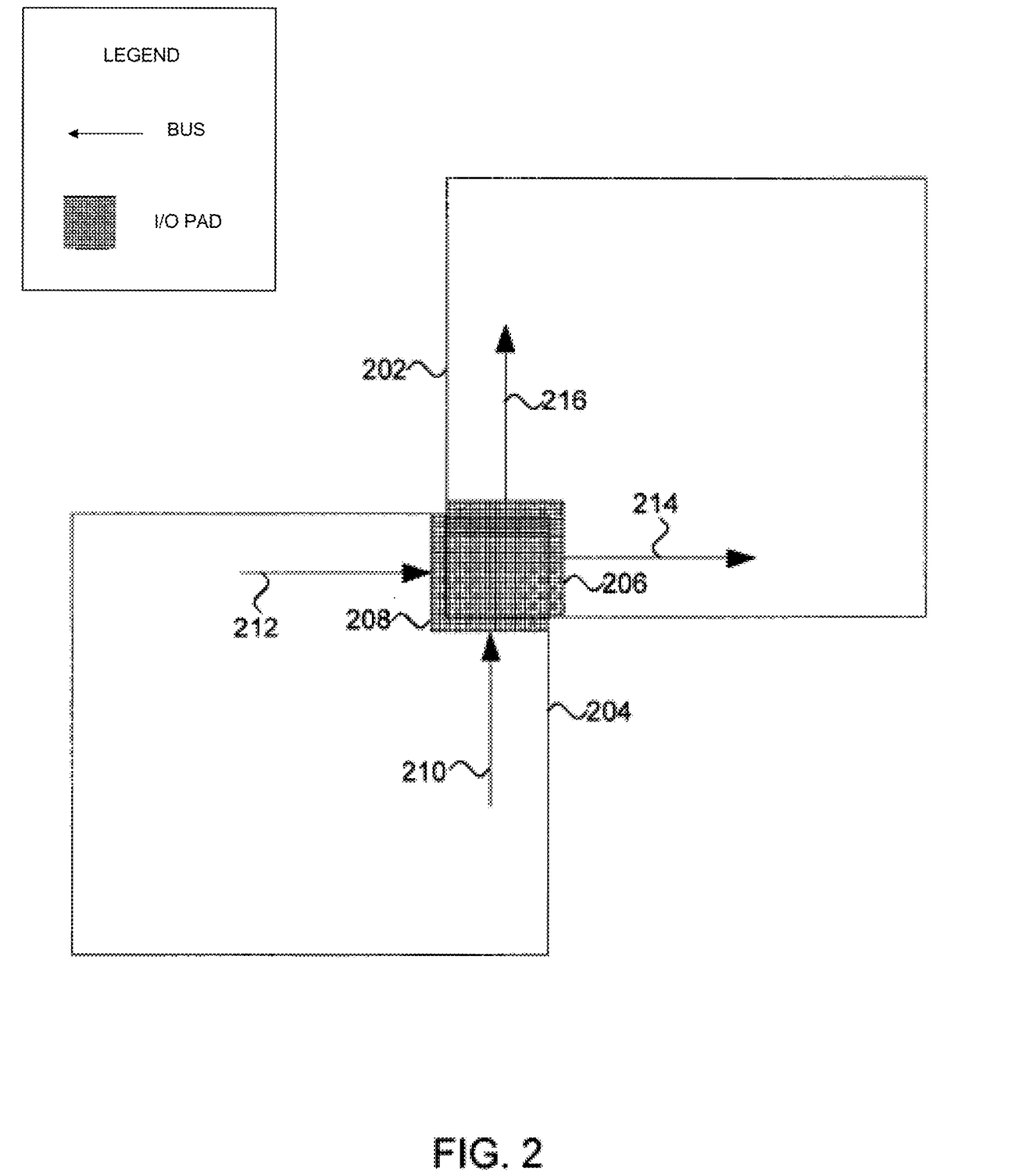
FIG. 2 is a functional block diagram showing capacitive coupling between chips according to one or more embodiments of the present invention.

FIG. 2 is a functional block diagram showing capacitive coupling between integrated circuits according to one or more embodiments of the present invention.

Referring to FIG. 2, chips 202 and 204 each have respective I/O pads 206 and 208 which capacitively couple signals between buses 210, 212, 214, and 216. Thus, a signal on bus 210 which is bound for chip 202 either as a final destination or as an intermediate destination headed for a different chip in the system will be transmitted through I/O pad 208 to I/O pad 206, and then to either of bus 214 or bus 216 as appropriate, depending on the final destination for the signal.

Figure 3:
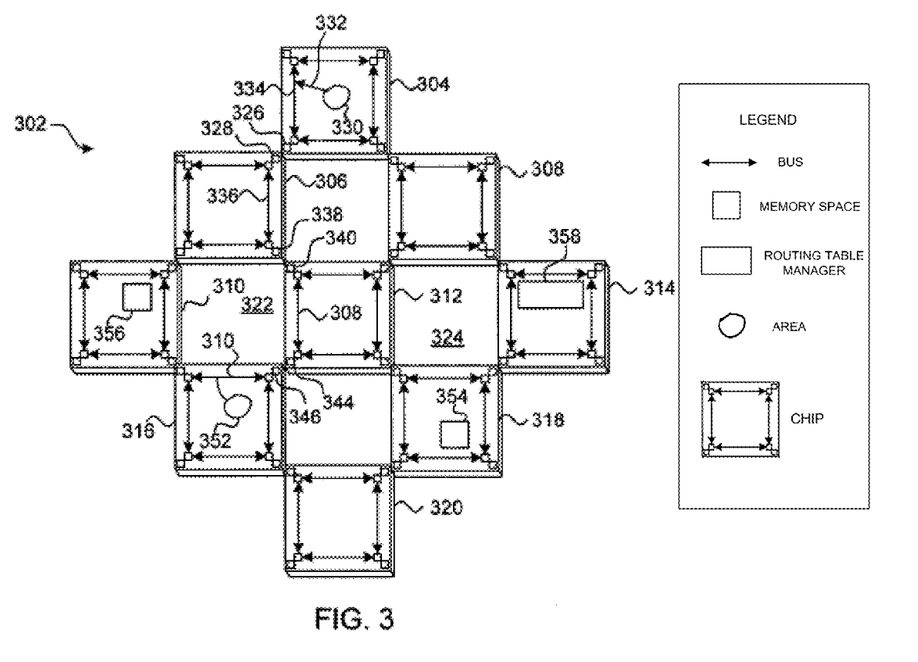
FIG. 3 is a functional block diagram of a system of interconnected integrated circuits in accordance with an embodiment of the present invention.

FIG. 3 shows an exemplary functional block diagram of a system of interconnected integrated circuits in accordance with an embodiment of the present invention. In FIG. 3, system 302 includes integrated circuits 304, 306, 308, 310, 312, 314, 316, 318 and 320 interconnected in a grid framework. Although this framework has an overall diamond shape, persons of ordinary skill having the benefit of this disclosure will readily recognize that, in one or more other embodiments of the present invention, other framework shapes and configurations are possible (e.g., rectangular, diamond). Further, although the exemplary configuration shown in FIG. 3 has spaces 322 and 324 within the framework, in one or more other embodiments of the present invention, configurations are possible that do not have spaces, such as those depicted in FIGS. 6A, 6B, and 6C of the '936 application. The exemplary framework configurations depicted and described herein are not intended to be limiting.

Adjacent integrated circuits, such as integrated circuits 304 and 306, are coupled at their respective corners so that the respective I/O circuitry, such as I/O circuitry 326 and 328, are in communication with each other. Thus, in one embodiment of the present invention, a packet originating within chip 304 destined for chip 316 may pass from an area 330 within chip 304 over pathway 332 to bus 334, through I/O circuitry 326 and 328, over bus 336 through I/O circuitry 338, over bus 340, through I/O circuitry 338 and 340, to bus 342, through I/O circuitry 344 and 346 to bus 348 at which time the packet may leave bus 348 over pathway 350 to arrive at area 352 within chip 316. Those of ordinary skill in the art having the benefit of this disclosure will readily recognize that several other communications paths (e.g., combinations of buses, I/O circuitry, etc. from one or more integrated circuits) exist that may alternatively be used to transmit a packet from chip 304 to chip 316.

In one or more embodiments of the present invention, at least one chip in the system includes updateable memory space, such as memory space 354 within chip 318, for storing information such as routing tables therein. In one embodiment of the present invention, shareable memory space, such as shareable memory space 356, within which routing tables and other information may be stored, may be shared by one or more integrated circuits, such as integrated circuits 310 and 316.

In one or more embodiments of the present invention, where shared memory space, such as memory space 356, is employed, an adjacent chip, such as chip 316, may determine proper routing for a packet by accessing routing information stored within shared memory 356.

In one or more embodiments of the present invention, at least one chip, such as chip 314, includes a routing table manager 358. In one embodiment of the present invention, routing table manager 358 is notified when one or more buses, such as bus 342, has been determined to be unusable. In this embodiment, should such a failure occur, routing table manager 358 communicates the failure to integrated circuits in the system having memory spaces containing routing tables, such as integrated circuits 308, 310, and 318, to ensure that the respective routing tables are updated to route packets around the failed bus or buses.

In one or more embodiments of the present invention, a packet is routed by accessed routing information from within a memory space, such as memory space 354 within chip 318. It is important to route a packet over the pathway that minimizes transmission latency. Those of ordinary skill having the benefit of this disclosure will readily recognize that transmission latency may often be minimized, for a given packet, by determining the communications path having the fewest chip-to-chip transfers of that packet between source and destination.

Figure 4:
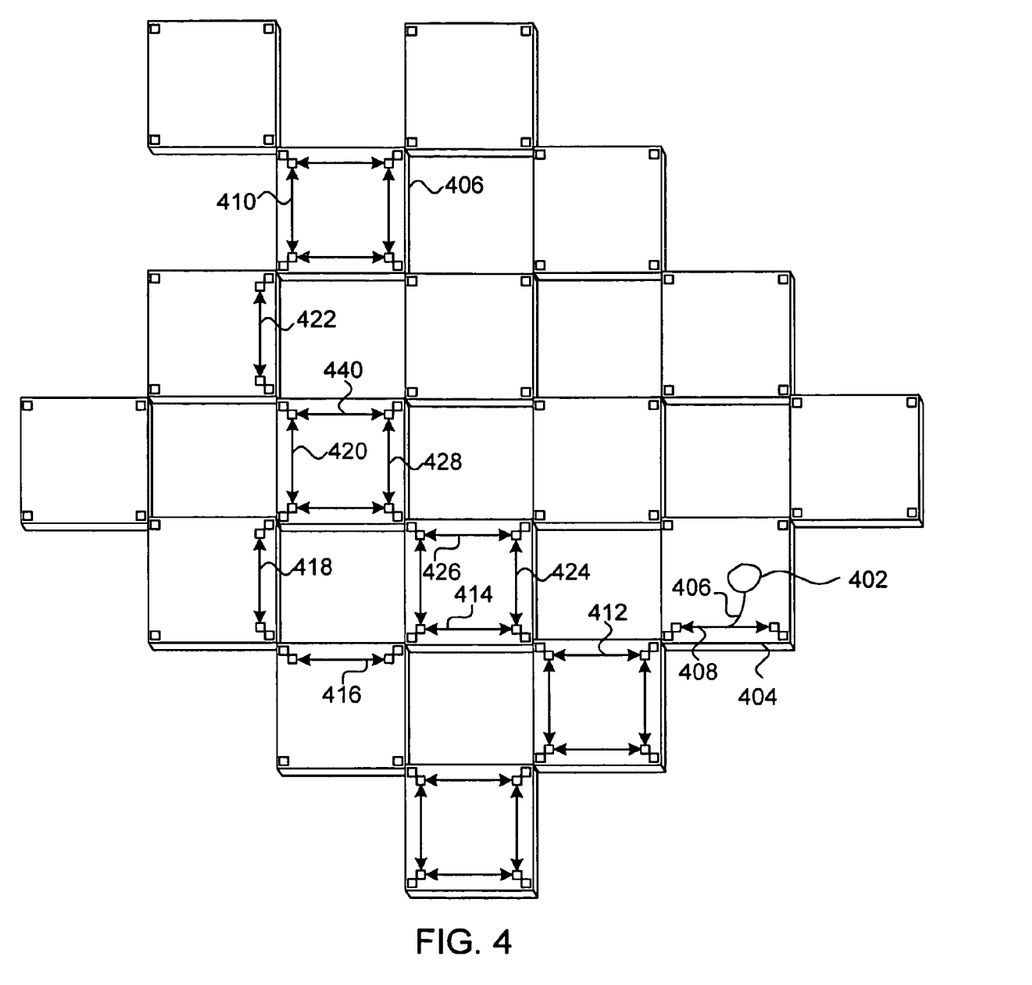
FIG. 4 is a functional block diagram of a system of interconnected integrated circuits showing possible communications pathway choices in accordance with an embodiment of the present invention.

FIG. 4 shows an exemplary functional block diagram of a system of interconnected integrated circuits showing possible communications pathway choices in accordance with one or more embodiments of the present invention. In FIG. 4, by way of example, a packet originating from area 402 of chip 404 destined for chip 406 may be routed over one of several possible pathways. One such pathway includes routing a packet from area 402 over conduit 406 to bus 408, thereafter routed to bus 410 over buses 412, 414, 416, 418, 420, and 422, at which time the packet arrives at destination chip 406.

Each time a packet passes over a bus within a chip, there is a bus latency cost b. When a packet passes from one chip to another, there is a further chip interconnect cost ci. Thus, with respect to the exemplary path routing of the packet from area 402 of chip 404 to chip 406 described above, assuming the chip bus latencies and the chip interconnect costs are relatively equal when comparing one integrated circuit to another, using this path routing results in a total cost of approximately 8b+7ci.

Alternatively, a packet originating from the same area 402 of chip 404 destined for chip 406 may be routed from area 402 over conduit 406 to bus 408, thereafter routed to bus 410 over buses 412, 424, 426 and 428 and 430, at which time the packet arrives at destination chip 406.

For this exemplary path routing, again assuming the chip bus latencies and the chip interconnect costs are relatively equal when comparing one integrated circuit to another, the total cost is approximately 9b+5ci. Thus, this path routing has less transmission latency than the path routing described above having a total cost of approximately 9b+7ci due to the difference between the path routings in the amounts of chip-to-chip relays of the packet.

By way of example, assume the grid is rectangular, and arranged as a coordinate grid, where the source integrated circuit is at coordinate (0,0) and the destination is at coordinate (x,y), where x>=y. It can be shown in a system having relatively equal bus latencies and chip interconnect costs through the grid of interconnected integrated circuits, that the total cost c of the shortest paths available between two integrated circuits is computed as follows $$c=((x-1)+(y-1))*b+x*ci$$

The number n of such shortest paths may be computed as $$n = \frac{l!(2^{y-1})}{((y-1)!(l-(y-1))!} \text{ where}$$

$$l = \frac{((y-1)+(x-1))}{2}$$

In FIG. 4, many pathways exist that may be used for the transmission of a signal from a given source chip to a given destination chip. Several methods of routing may employ present invention techniques, including, but not limited to, source routing, intermediate routing, and "on-the-fly" routing.

Source routing is a routing technique where the destination of the packet is known and the source integrated circuit fully determines the routing of the packet before sending it to the destination. When using source routing, the latency of complete pathways available between source and destination may be considered when routing the packet.

Intermediate routing is where the source chip "knows" the destination and indicates, as described in the '936 application, the number of horizontal and vertical hops a packet must take to get to the destination chip. Using this type of routing, the intermediate integrated circuits forwarding the packet decrement the given count of horizontal or vertical hops the packet has to take in order to reach the intended destination. When using intermediate routing, a system may cause one or more intermediate integrated circuits to review its routing table information to determine at least a portion of the best pathway to follow to another intermediate chip or to the destination chip.

"On-the-fly" routing is where the source specifies the destination chip in the packet header (or other convenient portion of the outgoing packet) and each intermediate chip determines the best pathway to use to forward the packet to the next intermediate chip towards the destination chip. When using "on-the-fly" routing, the source chip and each intermediate chip handling a given packet "decides," based on routing and latency information, where to next send the packet to get the packet to the final destination chip as quickly as possible.

Figure 5:
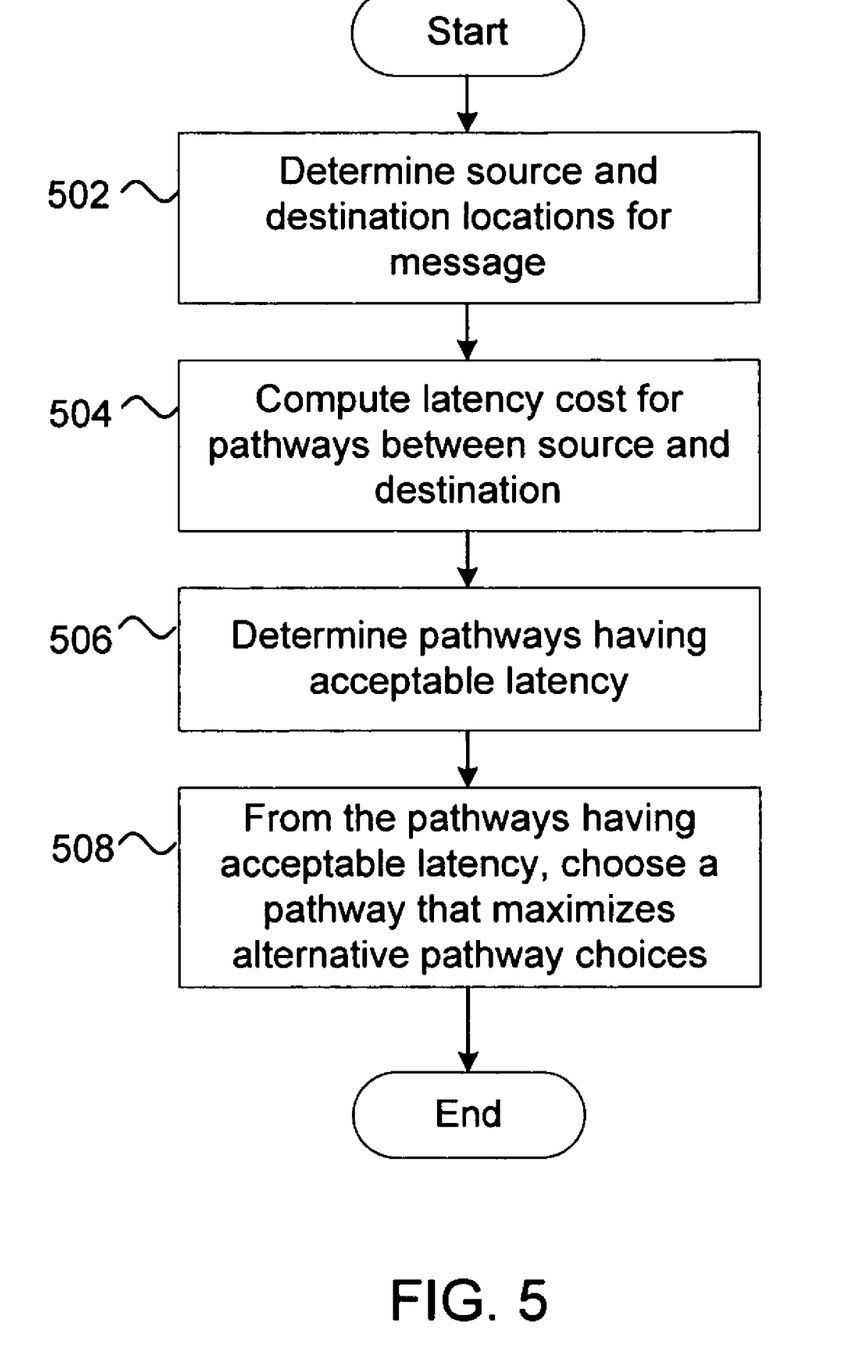
FIG. 5 is a flowchart of a technique for routing a packet from a source chip to a destination chip in accordance with an embodiment of the present invention.

FIG. 5 shows an exemplary flowchart of a technique for routing a packet from a source chip to a destination chip in accordance with an embodiment of the present invention.

In FIG. 5, the technique begins at step 502 when the source and destination integrated circuits for the packet are determined.

In step 504, a prediction is made of latency for pathways between the source and destination devices. In one or more embodiments of the present invention, such a prediction may be made from actual transmission latency resulting from previous similar packets that have been sent from the same source to the same destination. In one or more other embodiments of the present invention, a prediction may be based on computations using individual latencies based on the configuration of integrated circuits within the system. In one or more other embodiments of the present invention, a prediction may be based on a combination of actual transmission latency information and computational information.

In step 506, a determination of pathways having acceptable latency is made. In one or more embodiments of the present invention, such a determination may include a ranking of available pathways and choosing the best one or more pathways from the higher ranked pathways. In one or more other embodiments of the present invention, acceptable pathways may be determined by choosing an acceptable latency based on a distance the packet will have to travel.

In optional step 508, primarily used in intermediate and "on-the-fly" routing, a pathway is chosen that maximizes the number of alternative choices for pathway routing at each chip receiving the packet for retransmission. By way of example, when using intermediate routing where the number of horizontal and vertical hops is specified, if two choices of pathways at a given moment are seen to be equal in terms of transmission latency, it is often best to send the packet along the pathway which maximizes the number of possible pathway choices for intermediate destinations down the path. Should a potential pathway fail for some reason while the packet is in route, the number of pathway choices will diminish due to the failed pathway; however there will still likely be more choices available than in a case where the number of alternative pathways was not maximized in a retransmitting chip.

In one or more embodiments of the present invention, the number of alternative pathways may be maximized by causing, whenever possible, the packet to travel down the direction (e.g., horizontal or vertical for rectangular frameworks) having the most needed hops. Thus, if a destination is three vertical hops away, but seven horizontal hops away, the requirement to maximize alternatives would result in the packet being sent multiple horizontal hops for each vertical hop taken until the number of horizontal and vertical hops is approximately equal. The number of pathways available at any given time may be computed using the formula previously described.

In a large system having many different pathway choices for sending a particular packet, it is important to know if a pathway or a portion of a pathway has failed or is otherwise unavailable so that packet are routed around the unavailable pathway.

Figure 6:
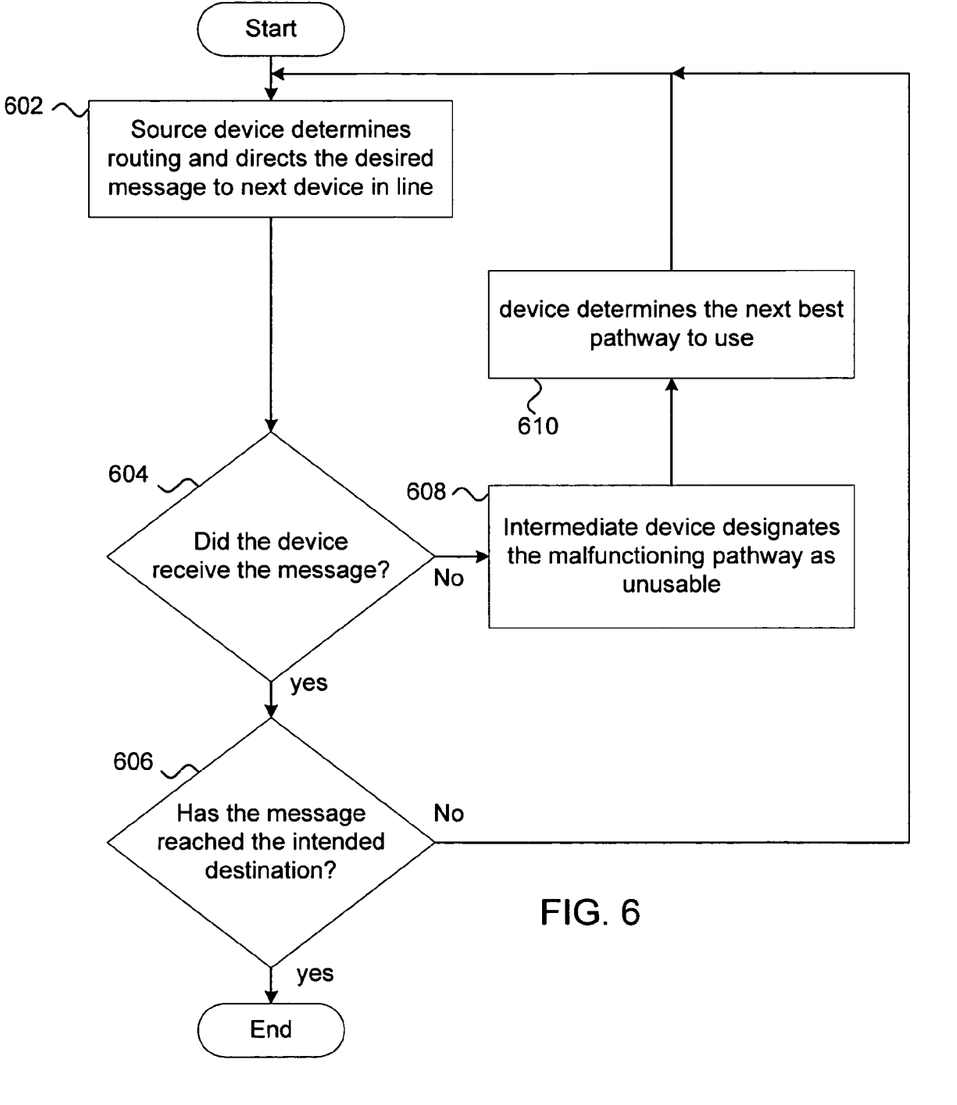
FIG. 6 is a flowchart of a technique for managing information relating to available pathways in accordance with an embodiment of the present invention.

FIG. 6 shows an exemplary flowchart showing a technique for managing information relating to the available pathways in accordance with an embodiment of the present invention. In FIG. 6, the technique begins at step 602 where a device having a packet to send determines the routing for the packet and sends the packet to the next device in line to receive the packet.

In step 604, it is determined whether the packet was received properly. If the packet was received properly, the technique proceeds to step 606 where it is determined whether the packet has reached its final destination.

If the packet has reached its final destination, the technique ends. Otherwise, if the packet has not reached its final destination, the technique proceeds back to step 602.

If, in step 604, the receiving device did not receive the packet, the technique proceeds to step 608 when the sending device designates the malfunctioning pathway as unusable. The designation of the unusable pathway may occur in any one or more of many possible ways, all of which are within the spirit of the present invention. In one or more embodiments of the present invention, the pathway manager determines which portions of which pathways are unavailable, leaving all other functioning portions of pathways free to pass data. By way of example, in those systems having a pathway manager, the device sends a packet to the pathway manager regarding the unusable pathway. In this case, the pathway manager updates affected routing tables to ensure that the unavailable pathway is not used. If the system has no path manager, the device may update its own routing table and send a packet to other affected devices causing them to also update their routing tables. In this case, affected devices include, but are not limited to, any device that is immediately adjacent and directly connected to the device having the unavailable pathway, and also devices that may have otherwise used the unavailable pathway to send a packet.

In one or more embodiments of the present invention, I/O interfaces are present along the edges of chips interconnected using overlapping capacitive coupling. Thus, rather than chips interfacing at the corners, one or more chips interface along an edge, using capacitive coupling to facilitate information transfer between the chips.

In one or more embodiments of the present invention, alternative pathway choices over pathways having similar latencies. This maximizes the possibility of local pathway congestion delaying the forwarding of a packet on to its destination.

In one or more embodiments of the present invention, packets in the system being forwarded between the source and destination are able to be routed around failed pathways, thus minimizing packet losses due to failing pathways within integrated circuits.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of routing a data packet in an electronic system formed of a plurality of integrated circuits communicatively coupled in a grid along first and second directions, each integrated circuit having a plurality of first buses along the first direction and a plurality of second buses along the second direction, the method comprising:

determining a first minimum number of first buses, selected from the plurality of first buses in each integrated circuit, the packet needs to traverse from an originating integrated circuit in order to reach a destination integrated circuit;

determining a second minimum number of second buses, selected from the plurality of second buses in each integrated circuit, the packet needs to traverse from the originating integrated circuit in order to reach the destination integrated circuit; and causing the packet to be first sent using an available pathway in a direction associated with a higher number of the first and second minimum numbers.

2. The method of claim 1, wherein the plurality of integrated circuits employs cornered I/O technology.

3. The method of claim 1, wherein a portion of at least one of the plurality of integrated circuits is capacitively coupled to a portion of at least another of the plurality of integrated circuits.

4. The method of claim 1, wherein the first and second directions are oriented in a horizontal direction and a vertical direction, respectively, and wherein the direction of the available pathway is one selected from a group consisting of left, right, up, and down.

5. The method of claim 1, wherein the first and second directions are oriented diagonally, and each of the first and second directions is one selected from a group consisting of up left, up right, down left, and down right.

6. The method of claim 1, further comprising:
updating, once the packet has traversed at least one first bus selected from the plurality of first buses in each integrated circuit, a number of first buses left to be traversed in the available pathway.

7. The method of claim 1, further comprising:
determining the available pathway using a routing table listing a plurality of available pathways formed from the plurality of the first buses and the plurality of the second buses in each integrated circuit, the determining being dependent on a minimal latency among the plurality of available pathways.

8. The method of claim 1, further comprising:
determining the available pathway using a routing table listing a plurality of available pathways formed from the plurality of the first buses and the plurality of the second buses in each integrated circuits, the determining being dependent on maximum alternative pathway choices in order to reach the destination integrated circuit from an intermediate integrate circuit in the available pathway.

9. An electronic system for routing a packet, comprising: a plurality of devices interconnected using a plurality of cornered I/O to form a grid having a first direction and a second direction, each of the plurality of cornered I/O comprising I/O circuits in a corner of a device of the plurality of devices, each device having communications pathways disposed therein; wherein the communications pathways comprise a plurality of first buses along the first direction and a plurality of second buses along the second direction; a routing table device comprising at least one updateable routing table; and a dedicated routing table manager device, external to the routing table device and separate from the routing table device, and configured to receive information regarding availability of the communications pathways in the plurality of devices and update the updateable routing table when the availability of the communications pathways changes, wherein the at least one updateable routing table is used for: determining a first minimum number of first buses, selected from the plurality of first buses in each device, the packet needs to traverse from an originating device in order to reach a destination device; determining a second minimum number of second buses, selected from the plurality of second buses in each device, the packet needs to traverse from the originating device in order to reach the destination device; and causing the packet to be first sent using an available pathway in a direction associated with a higher number of the first and second minimum numbers.

10. The system of claim 9, wherein the information comprises an indication of a relative transmission latency of at least one pathway as compared to another pathway.

11. The system of claim 10, wherein the indicator of relative latency is an ordering of the pathways in the at least one updateable routing table.

12. The system of claim 9, wherein the routing table manager device is configured to determine whether portions of the communications pathways are unavailable for communication by receiving information regarding availability of a pathway from another device in the system.

13. The system of claim 9, wherein the routing table manager device is configured to determine whether portions of the communications pathways are available for communication by transmitting a packet using the communications pathways and receiving an indication of packet receipt from a destination device.

14. The system of claim 13, wherein the transmitting the packet is triggered to take place during initialization of the system.

15. The system of claim 9, wherein the routing table manager device is configured to determine a pathway is not available through failure of an acknowledgement of receipt to arrive.

16. The system of claim 9, wherein the at least one updateable routing table is embedded within one of the plurality of devices.

17. The system of claim 9, wherein at least one of the plurality of devices is configured to determine when a bus in the communications pathways is unavailable due to local congestion and to route a packet to an alternate bus having approximately same latency criteria.

18. The system of claim 17, wherein the local congestion is defined as the bus being temporarily unavailable due to other preexisting data traffic occupying the bus.

* * * * *